United States Patent Office 2,926,083
Patented Feb. 23, 1960

2,926,083

TERNARY ALLOY-CONTAINING PLUTONIUM

James Thomas Waber, Los Alamos, N. Mex., assignor to the United States of America as represented by the United States Atomic Energy Commission No Drawing. Application April 10, 1957
Serial No. 652,070

4 Claims. (Cl. 75—122.7)

This invention relates to alloys of plutonium and in particular to alloys of plutonium which may be used as nuclear reactor fuels.

Although uranium 235 has generally been used as the fuel or active material in nuclear reactors, in certain nuclear reactor applications it is more desirable to use plutonium as the active material. This is particularly true when the neutronic reactor is to operate with a neutron flux of fast or epithermal energies, such as, for example, the fast plutonium reactor described in AEC Report LA-1679.

Some nuclear reactors, in addition to providing a useful neutron or heat flux, provide a means for creating new active material or fuel within the reactor. These are known as breeder reactors. In a breeder reactor, the breeding ratio depends upon the excess of the number of neutrons born over the number lost in capture including fission, and assuming no leakage, so that:

$$R = \text{breeding ratio} = \frac{\nu - 1 - \alpha}{1 + \alpha} \quad (1)$$

where $R > 1$ for useful breeding,
where $\nu$ = average number of neutrons per fission,
and $\alpha = \sigma_c / \sigma_f$,
where $\sigma_c$ = capture cross section,
and $\sigma_f$ = fission cross section.

TABLE I

| | $U^{235}$ | R | $Pu^{239}$ | R |
|---|---|---|---|---|
| $\nu$ | 2.5 | | 2.9 | |
| $\alpha$ (slow neutrons: .03 E.V.) | .185 | 1.11 | .540 | 0.883 |
| $\alpha$ (epithermal neutrons: 1 E.V.) | .250 | ~1.00 | .305 | 1.22 |

When the values of Table I are inserted in Equation 1, it can be seen that in a reactor operating with thermal neutrons, $U^{235}$ is suitable as a breeder fuel but $Pu^{239}$ is not, as $\alpha$ for $U^{235}$ at thermal energies is low enough to provide a breeding ratio (R) greater than 1. However, at epithermal energies, $Pu^{239}$ is suitable as a breeder fuel, as $\alpha$ for $Pu^{239}$ is low enough to provide an $R > 1$, and as can be seen by Table I, $U^{235}$ is not suitable.

It may be seen then, that the breeding ratio for $Pu^{239}$ in the epithermal range may be considerably greater than 1 but is barely 1 for $U^{235}$. Since a breeding ratio must be appreciably greater than 1 to be useful, $U^{235}$ is not practical as an epithermal breeder reactor core material.

Pure plutonium may be used in a non-breeder fast reactor but its use has several disadvantages. One of the disadvantages of the use of pure plutonium is that the plutonium is consumed during the operation of the reactor and the fuel element must be replaced or reprocessed periodically as a certain percentage of the plutonium is "spent." Another disadavantage to the use of pure plutonium is that all of the heat is generated in a small volume of material with attendant difficulties of cooling. In order to reduce the intensity of heat generation in the plutonium, the use of diluents with plutonium has already been suggested, but other problems occur. When most diluents are added to plutonium, the neutrons tend to be moderated, thus increasing the parasitic capture in plutonium 239 to form plutonium 240. Furthermore, diluents have also been found to create competing neutron reactions which also decrease the effectiveness of the reactor for breeding. Likewise, from a metallurgical standpoint, such alloys of plutonium commonly have phase structures which give the metal undesirable properties.

When $Pu^{240}$ is formed in a fast reactor, it adds to the reactivity, as it is a fast fission material. However, $Pu^{240}$ in a reactor whose neutrons have been slowed down acts as a non-fissile material, since it increases non-fission capture. Thus, the neutrons captured in producing $Pu^{240}$ in a thermal reactor are lost to the fissile system.

However, in a fast breeder reactor, new plutonium atoms created in uranium add to the reactivity of the reactor. The uranium in such a reactor may be integral in the plutonium core or surround the core as a blanket. The ratio of uranium to plutonium may vary over wide ranges for operative reactors. Thus the percentage of uranium may be up to 90 percent and still achieve a practical breeding efficiency.

Since the parasitic capture of neutrons in the reaction $$Pu^{239} + n \rightarrow Pu^{240}$$

increases with a decrease of neutron energy, the reactor core must contain materials which will not appreciably moderate fast neutrons. $U^{238}$ is allowable up to about 90 percent of the plutonium-uranium ratio.

Binary alloys of uranium and plutonium have been produced, but they possess very bad characteristics for fabrication, machining, casting and corrosion resistance. These alloys are brittle and glass-like, cannot be cast without many minute cracks and are found to corrode readily. The poor qualities of the uranium-plutonium alloys may be attributed to the presence of only the zeta phase.

By this invention alloys of plutonium, uranium and at least a third element may be produced which either eliminates the zeta phase or reduces its amount so that the alloys are machinable, easy to fabricate and may be cast free of cracks. Furthermore, the alloys of this invention are resistant to corrosion in gaseous or aqueous environments. By comparison, a plutonium-uranium binary alloy is a very subject to corrision in the same media.

It is therefore an object of the present invention to provide an alloy of plutonium which can be cast or fabricated free of cracks.

Another object of the present invention is to provide an alloy of plutonium which is relatively resistant to corrosion.

Another object of the present invention is to provide an alloy containing uranium and plutonium which may be used as the fuel element in a fast breeder reactor.

Another obect of the present invention is to provide an alloy of plutonium and uranium which is not all zeta phase.

The objects of this invention are obtained by the production of a multicomponent alloy in which the plutonium to uranium ratio is between 10 to 50 atoms of plutonium and 90 to 50 atoms of uranium, said alloy containing 2 to 25 atomic percent of a metal selected from the class consisting of molybdenum and zirconium.

When molybdenum is selected as the third element, the alloy can be prepared to exist in either a dispersed zeta phase or a body-centered cubic phase depending upon the percentage molybdenum and the alloy heat treatment.

The metallurgical properties of the ternary alloy of this invention make it a practical, workable material having desirable characteristics in nuclear reactors. Instead of the usual brittle alloy full of minute cracks, the subject alloy can be machined with relative ease and is easy to fabricate. The casting properties are excellent, as sound crack-free castings are easily made. It forms an isotropic mixture which is also more resistant to radiation damage than the binary plutonium-uranium alloy.

Molybdenum and zirconium do not substantially moderate fast or epithermal neutrons, nor do they show any substantial parasitic neutron capture for neutrons having energies greater than about .03 E.V., i.e., thermal neutrons.

The uranium in the alloy will be converted to plutonium while the fast reactor operates, thus spent fuel is automatically replaced and at the same time the volume of the plutonium-containing material will be larger than pure plutonium to facilitate cooling.

Nuclear reactors in which the alloys of the present invention are particularly useful as fuels are well known in the art. For example, AEC Report LA-1679, declassified March 11, 1957, the subject matter of which is incorporated herein by reference, describes a fast reactor in which the alloys of the present invention could be used.

Under strong neutron bombardment, alloys generally change phase if they exist in a phase that a thermal shock such as a thermal spike would tend to change. A thermal spike has the effect of local heating followed by rapid quenching since the spike volume is surrounded by a mass of cooler metal. It is to be expected that under strong neutron bombardment the zeta phase would change to the gamma phase in aloys containing more than 12 percent molybdenum, particularly if a few "centers" of gamma phase exist at the beginning. Since such phase changes are usually accompanied by changes in volume, it is usually desirable to start with the reactor alloy in its most stable phase, which in this case is gamma or body-centered cubic. It should be emphasized that a volume change results in a change in reactivity of the reactor which can be hazardous and at least undesirable. Also, phase changes generally alter the shape of the fuel elements, which can cause serious damage.

The alloys of this invention are prepared by any one of several methods. They may be prepared by melting the weighed amounts of the constituents in a vacuum induction furnace whereby the metals are mixed through the stirring action of the induction field. Alternately, pure molybdenum of molybdenum fluoride can be added to a mixture of plutonium fluoride and uranium fluoride, and the alloy produced by co-reduction of the fluorides using the technique given in the R. D. Baker copending application S.N. 543,630, filed October 28, 1955, the disclosure of which is incorporated herein by reference. However, it has been found by experience that if more than 5 percent molybdenum is desired in the alloy it is preferable to use molybdenum metal rather than a reducible molybdenum compound, e.g., oxides or chlorides, because of the better mixing characteristics of the metal. Below 5 percent bolybdenum either metal or compound may be used. In addition to the methods suggested, any methods used in the art for mixing plutonium or uranium alloys may be used for mixing the alloys of the present invention.

This invention provides two useful alloy structures for the ternary molybdenum-plutonium-uranium alloy containing a percentage of molybdenum in the range of 2 atomic percent to about 25 atomic percent. One of these is a body-centered cubic (gamma) crystal structure, and the other is a mixture of zeta phase with gamma. With less than 2 precent molybdenum, the alloy has undesirable properties characteristic of the zeta phase. Above 25 percent, the alloy has excellent properties. However, the amount of molybdenum becomes so great that the dilution of the plutonium is undesirable.

These alternate structures may be obtained by appropriate heat treatment. Though it is understood the preferred embodiment is a body-centered cubic (gamma) crystal structure which is isotropic, it is also possible to provide the modified zeta phase which overcomes most of the undesirable properties of that phase.

To produce the preferred body-centered cubic crystal structure in alloys containing 8 to 25 atomic percent molybdenum, alloys must be cooled rapidly from above about 800° C. by quenching. However, the quenching or cooling rate which is required may be reduced as the content of molybdenum is increased.

When the percentage of molybdenum in the alloy is at least 8 percent a useful alloy, which is not exclusively of the preferred body-centered cubic but contains dispersed zeta in partially transformed gamma phase, may be obtained by cooling more slowly than quenching. However, to obtain this dispersed zeta when the percentage of molybdenum is less than about 8 percent, the cooling rate must be very rapid, as by liquid quenching. If the alloy is cooled more slowly than this, some of the undesirable characteristics of unalloyed zeta appear. In general the cooling rate must be increased as the percentage of molybdenum is made smaller.

In the range of about 2 to 8 atomic percent, a useful dispersed zeta phase alloy may be obtained by rapid quenching of the alloy. This improved zeta phase is more corrosion resistant and has improved fabrication qualities as compared to the normal zeta phase, though it does not show as great an improvement as the body-centered cubic.

It has been determined that the addition of appreciable amounts of molybdenum, e.g., above about 20 atomic percent to an alloy of plutonium and uranium, will provide a crystal structure that is a body-centered cubic (gamma) unless the alloy is furnace cooled. With 16 percent molybdenum the alloy is useful even if the alloy is cooled very slowly in a furnace.

Table II shows a summary of the cooling methods to be employed to achieve the alloy structures which may be produced by the methods hereinbefore described:

TABLE II

| Atomic Percent Mo | Cooling Means | Phase | Comments |
|---|---|---|---|
| 2-12 | Rapid quench | Zeta+Gamma | Useful but not preferred. |
| 2-12 | Cooled slower than minimum. | Zeta | Undesirable properties. |
| 12-25 | Quench | Gamma | Preferred embodiment. |
| 12-25 | Air cool, etc | Zeta+Gamma | Useful. |
| 4-12 | Cooled faster | Zeta+Gamma | Useful but not preferred. |

In the above table the alloys represented, for example, are based on a plutonium to uranium ratio of 1 to 3.

It is recognized that in some cases it may be desirable to reheat the alloy after it is cast and then cool it at one of the rates indicated above to achieve the desired properties.

*Example I*

To produce a ternary alloy in the gamma phase, 239 grams of plutonium, 714 grams of uranium and 72 grams of molybdenum (about 15 atomic percent) are placed in a magnesia crucible, the crucible is then placed in a vacuum and the mixture melted by induction heating. The mix is kept molten at a temperature of at least 1275° C. for about 5 minutes so it is thoroughly mixed and homogeneous. The crucible is sealed, removed from the furnace, and quenched by cooling rapidly in a water (or oil) bath. The resulting alloy will be in the gamma phase.

*Example II*

To produce, for example, a useful ternary alloy containing the dispersed zeta phase, 239 grams of plutonium, 714 grams of uranium and 23 grams of molybdenum (about 6 atomic percent) are placed in a crucible and melted in the same manner as the above example. The melt can be cooled to 800° C. and is then quenched in water.

*Example III*

To produce, for example, a ternary alloy using the co-reduction process 315 grams of $PuF_4$, 942 grams of $UF_4$, 304 grams $I_2$, 460 grams calcium are placed in a crucible with 72 grams molybdenum metal. The crucible is sealed and heated to a reaction temperature of about 300° C., whereby the plutonium and uranium will be reduced to metal and will alloy with the molybdenum. This alloy can be removed as a metal button from the bottom of the crucible. Subsequently it may be reheated and quenched to produce the gamma phase.

The present invention also contemplates the use of zirconium in place of all or part of the molybdenum used in the above example with beneficial results. Zirconium improves the zeta phase and makes the alloy more corrosion resistant and a better alloy than the binary alloy, but molybdenum is generally superior.

Other embodiments to this invention may be apparent to those skilled in the art and therefore this invention is not limited by the foregoing specification, but only by the appended claims.

What is claimed is:

1. An alloy consisting essentially of from 2 to 25 atomic percent of at least one of the elements selected from the class consisting of molybdenum and zirconium, balance a combination of uranium and plutonium, said combination containing one to nine atoms of uranium for each atom of plutonium, said alloy containing no undispersed zeta phase.

2. An alloy having a body-centered cubic crystal structure, consisting essentially of from 12 to 25 atomic percent molybdenum, balance a combination of uranium and plutonium in the ratio of one to nine atoms of uranium per atom of plutonium.

3. An alloy consisting essentially of about 20 atomic percent plutonium, about 20 atomic percent molybdenum, and the balance uranium.

4. An alloy containing zeta phase dispersed in partially transformed gamma phase and consisting essentially of from 2 to 25 percent molybdenum, balance a combination of uranium and plutonium containing one to nine atoms of uranium per atom of plutonium.

References Cited in the file of this patent

UNITED STATES PATENTS 2,888,343    McGeary et al. _____ May 26, 1959

FOREIGN PATENTS 766,060    Great Britain _____ Jan. 16, 1957

OTHER REFERENCES

Technical Progress Review, "Reactive Core Materials," U.S.A.E.C., by Battelle Memorial Institute, vol. I, No. 2, May 1958, pages 9, 10, 17; vol. I, No. 1, March 1958, pages 9, 16.

Saller et al.: USAEC Document BMI-730, dated March 6, 1952, declassified December 7, 1955, 17 pages. Available at 15¢ from O.T.S., Dept. of Commerce, Washington 25, D.C.

Draley et al.: USAEC Document ANL-5030, dated April 14, 1953, declassified December 9, 1955, 56 pages. Available at 40¢ from O.T.S., Dept. of Commerce, Washington 25, D.C.

Finniston et al.: "Progress in Nuclear Energy," Series V, Metallurgy and Fuels, published 1956 by McGraw-Hill Book Co., Inc., N.Y., pages 396–409.